US008447589B2

(12) United States Patent
Ishikawa et al.

(10) Patent No.: US 8,447,589 B2
(45) Date of Patent: May 21, 2013

(54) TEXT PARAPHRASING METHOD AND PROGRAM, CONVERSION RULE COMPUTING METHOD AND PROGRAM, AND TEXT PARAPHRASING SYSTEM

(75) Inventors: Kai Ishikawa, Tokyo (JP); Susumu Akamine, Tokyo (JP)

(73) Assignee: NEC Corporation, Tokyo (JP)

( * ) Notice: Subject to any disclaimer, the term of this patent is extended or adjusted under 35 U.S.C. 154(b) by 973 days.

(21) Appl. No.: 12/448,421

(22) PCT Filed: Dec. 21, 2007

(86) PCT No.: PCT/JP2007/074628
§ 371 (c)(1),
(2), (4) Date: Jun. 19, 2009

(87) PCT Pub. No.: WO2008/078670
PCT Pub. Date: Jul. 3, 2008

(65) Prior Publication Data
US 2010/0010803 A1 Jan. 14, 2010

(30) Foreign Application Priority Data
Dec. 22, 2006 (JP) .................... 2006-345757

(51) Int. Cl.
*G06F 17/27* (2006.01)
(52) U.S. Cl.
USPC .......................................................... 704/9
(58) Field of Classification Search
None
See application file for complete search history.

(56) References Cited

U.S. PATENT DOCUMENTS

| 5,237,502 | A  | * | 8/1993  | White et al. ...................... 704/1   |
| 6,327,566 | B1 | * | 12/2001 | Vanbuskirk et al. .......... 704/257         |
| 7,236,968 | B2 |   | 6/2007  | Seki et al.                                  |
| 7,412,385 | B2 | * | 8/2008  | Brockett et al. .............. 704/245       |
| 7,584,092 | B2 | * | 9/2009  | Brockett et al. .................. 704/9     |

(Continued)

FOREIGN PATENT DOCUMENTS

| JP | 2002-014990 | 1/2002 |
| JP | 2004-171354 | 6/2004 |
| JP | 2005-092271 | 4/2005 |

OTHER PUBLICATIONS

Ingrid Zukerman, Bhavani Raskutti, and Yingying Wen, "Experiments in Query Paraphrasing for Information Retrieval", in Proceedings of the 15th Australian Joint Conference on Artificial Intelligence: Advances in Artificial Intelligence (AI '02), pp. 24-35, 2002.*

(Continued)

*Primary Examiner* — Brian Albertalli
(74) *Attorney, Agent, or Firm* — Foley & Lardner LLP

(57) ABSTRACT

A paraphrase model of a question text inputted by a user is learned, and a paraphrase expression is generated in real time. When information in text set storage unit is updated, text pair extracting unit extracts a paraphrase text pair from the text set storage unit and stores it in text pair storage unit. Model learning unit learns a question text paraphrase model from the paraphrase text pair in text pair storage unit, and stores it in model storage unit. Text pair extracting unit extracts a paraphrase text pair again from the text set storage unit by using the question text paraphrase model which the model storage unit possesses, and stores it in the text pair storage unit. In case where the stored paraphrase text pair is the same as the paraphrase text pair stored in the text pair storage unit, learning of the question text paraphrase model is ended. Candidate creating unit reads the question text paraphrase model from the model storage unit and generates a paraphrase candidate of the inputted question text.

6 Claims, 23 Drawing Sheets

U.S. PATENT DOCUMENTS

| | | | |
|---|---|---|---|
| 7,805,303 B2* | 9/2010 | Sugihara et al. | 704/257 |
| 7,937,265 B1* | 5/2011 | Pasca et al. | 704/9 |
| 7,937,396 B1* | 5/2011 | Pasca et al. | 707/750 |
| 2008/0040339 A1* | 2/2008 | Zhou et al. | 707/5 |
| 2009/0119090 A1* | 5/2009 | Niu et al. | 704/1 |
| 2010/0005081 A1* | 1/2010 | Bennett | 707/4 |

OTHER PUBLICATIONS

Kathleen R. McKewon, "Paraphrasing Questions Using Given and New Information", American Journal of Computational Linguistics, Jan.-Mar. 1983.*

Florence Duclaye, Francois Yvon, and Olivier Collin, "Learning paraphrases to improve a question-answering system", in EACL 2003, 11th Conference of the European Chapter of the Association for Computational Linguistics, Workshop in NLP for QA, Budapest, Hungary, Apr. 2003.*

Fujita et al., "A Class-Oriented Approach to Building a Paraphrase Corpus," 8 Sheets.

Ishikawa et al., "A Q&A Document Retrieval Method Utilizing Question Type and Question Topic," Technology Ippan Koen Ronbunshu, vol. 2, Aug. 21, 2006, pp. 171-172.

* cited by examiner

FIG. 4A

| Q_ID | TEXT CONTENTS |
|---|---|
| Q1 | PASSWORD WO WASUREMASHItA. BROWSER NI KIOKUSASETE IMASITAGA, COOKY WO AYAMATTE SHOUKYO SHITESHIMATTA TAMENI, PASSWORD WO WASURETE SHIMAIMASHITA. OSHIETE KUDASARUKA, HOMEPAGE NO URL NO SAIHAKKO WO ONEGAISHIMASU.<br>(I HAVE FORGOTTEN THE PASSWORD. IT WAS SAVED IN THE BROWSER, BUT I DELETED THE COOKIES BY MISTAKE, AND SO I HAVE FORGOTTEN THE PASSWORD. CAN YOU PLEASE TELL ME WHAT IT IS, OR CAN YOU RE-ISSUE THE WEBSITE URL?) |
| Q2 | FTP PASSWORD GA WAKARANAI NODESUGA...? SHIRABERUKOTO HA DEKIMASUKA?<br>(I DON'T KNOW THE FTP PASSWORD ... IS IT POSSIBLE TO LOOK IT UP? ) |
| Q3 | HOMEPAGE ID TO HP PASSWORD GA WAKARIMASEN. SAIHAKKO SHITE ITADAKEMASUKA?<br>(I DON'T KNOW THE WEBSITE ID AND WEBSITE PASSWORD. IS IT POSSIBLE TO RE-ISSUE THEM? ) |
| Q4 | TENSO NI SHITATOKI FTP PASSWORD GA TADASHIKUNAI TO ITTE KYOHI SAREMASHITA.<br>(THE FTP PASSWORD THAT WAS SENT WAS REJECTED AS BEING INCORRECT.) |
| Q5 | KONKAI HAJIMETE hp WO TENSO SURU NODESUGA, NANDO YATTEMO, 「SERVEWR XXXXXXXX NO USER ID MATAHA PASSWORD GA TADASHIKU ARIMASEN」TO DERUNODESUGA DONOYOUNI TAISHO SUREBA YOI NODESUKA.<br>(THIS IS MY FIRST TIME TO ACCESS THE WEBSITE, BUT ALTHOUGH I HAVE TRIED SEVERAL TIMES, I KEEP GETTING "USER ID OR PASSWORD FOR XXXXXXXX SERVER IS INCORRECT". WHAT SHOULD I DO?) |
| Q6 | HOMEPAGE WO SAKUSEI SHITA NO DESUGA FTP PASSWORD GA WAKARANAI NODESU. MAENI ITADAITA SHITANO KOUMOKU NO HOKA NAINODESU. OSHIETE KUDASAI.<br>[FILE TENSOJI NO GOCHUI]<br>＊TOP PAGE NO FILE MEI HA index.html MATAHA, index.htm NI SHITE KUDASAI.<br>＊UPLOAD SURUSAINO FILE MEIHA HANKAKUEISUJI WO GORIYOU KUDASAI.<br>(I HAVE CREATED A WEBSITE, BUT I DO NOT KNOW THE FTP PASSWORD. I ONLY HAVE THE FOLLOWING ITEMS YOU GAVE ME EARLIER. PLEASE LET ME KNOW WHAT I SHOULD DO.<br>"WHEN SENDING FILES, PLEASE NOTE THE FOLLOWING:<br>* PLEASE GIVE THE TOP PAGE THE FILE NAME 'index.html' OR 'index.htm'<br>•WHEN UPLOADING FILES, PLEASE USE SINGLE BYTE ENGLISH CHARACTERS FOR FILE NAME.") |
| Q7 | OTEGARU HOMEPAGE TO IUNO WO「KOUNYU」SHITARA, TSUGINO PAGE DE 「SETTEI」TOIUNOGA DETEKITE, 「PASSWORD」TOKA WO NYURYOKU SURU TOKOROGA ARIMASUGA,NANI WO NYURYOKU SHITARA IINOKA WAKARIMASEN. OSHIETE KUDASAI.<br>(AFTER "PURCHASE" OF THE SIMPLE WEBSITE, THE FOLLOWING PAGE SHOWS "SET", AND THERE IS A PLACE TO INPUT "PASSWORD" ETC., BUT I DO NOT KNOW WHAT TO INPUT. PLEASE LET ME KNOW WHAT I SHOULD DO.) |

FIG. 4B

| Q_ID | TEXT CONTENTS |
|---|---|
| Q8 | HOMEPAGE NO ID MATAHA PASSWORD GA CHIGAIMASU TO DERU NODE TENSO GA DEKIMASEN. DEKIREBA TADASHII NOWO OOSHIE NEGAEMASEN KA. OISOGASHII TOKORO MOUSHIWAKE ARIMASEN.<br>(THE OUTPUT SAYS THAT THE WEBSITE ID OR PASSWORD IS WRONG, AND IT IS NOT POSSIBLE TO SEND. IF POSSIBLE, COULD YOU LET ME KNOW THE CORRECT INFORMATION. MY APOLOGIES FOR TROUBLING YOU. ) |
| Q9 | GENNZAI ARU HOMEPAGE WO HENSHU SHITAINONI, FTP PASSWORD GA ICHHI SHIMASEN TO NANDOMO DETE SHIMAUNDESUKEDO DOUSHITARA IINODE SHOKA. HOMEPAGE ID TO FTP PASSWORD GA WAKARANAIDESU. (MEMO KARA NYURYOKU SHITERUN DESUGA NANI GA CHIGAUKA WAKARANAI.)<br>(I WANT TO EDIT THE CURRENT WEBSITE, BUT I REPEATEDLY GET THE OUTPUT THAT THE FTP PASSWORD DOES NOT MATCH. PLEASE LET ME KNOW WHAT I SHOULD DO. I DO NOT KNOW THE WEBSITE ID AND FTP PASSWORD. (I INPUTTED FROM A MEMO BUT I DON'T KNOW WHAT IS WRONG.) ) |
| Q10 | KONBANNWA!! OKINIIRI GALLERY SET WO KONYU SHITAINODESUGA FTP PASSWORD WO WASURETE SHIMATTANODE KANKYO SETTEI GA DEKIMASEN. OSHIETE KUDASAI.<br>(GOOD EVENING. I BOUGHT THE FAVORITE GALLERY SET, BUT I HAVE FORGOTTEN THE FTP PASSWORD SO I CANNOT DO THE ENVIRONMENT SETTING. PLEASE LET ME KNOW WHAT I SHOULD DO.) |
| Q11 | ONEGAI ITASHIMASU. 「OTEGARU HOMEPAGE」MOSHIKOMIMASHITA. SETTEI NI HAIRIMASHITAGA HOMEPAGE ID HA 「XXXXXXXX」DESUGA HOMEPAGE PASSWORD GA YOKU WAKARIMASEN. DOKO WO MIREBA YOINODESHOKA.<br>(PLEASE HELP. I APPLIED FOR THE "SIMPLE WEBSITE". I INPUTTED THE SETTING. THE WEBSITE ID IS "XXXXXXXX" BUT I DO NOT KNOW THE WEBSITE PASSWORD. PLEASE LET ME KNOW WHAT PLACE I SHOULD LOOK AT. |
| Q12 | HOMEPAGE NO SHINKI KAISETSU TETSUZUKI WO SHITATOKORO PASSWORD GA OKURARETE KIMASENDESHITA. SONOTAME, PASSWORD GA WAKARIMASEN! SHIKASHI, PASSWORD NO SAIHAKKO WO SHIYOTO SHITEMO,NAZEKA DEKIMASEN DESHITA. DOU SUREBA YOI NO DESUKA?<br>(I APPLIED TO SETUP A NEW WEBSITE, BUT A PASSWORD WAS NOT SENT, SO I DON'T KNOW THE PASSWORD. I ATTEMPTED TO HAVE THE PASSWORD RE-ISSUED, BUT FOR SOME REASON I DIDN'T SUCCEED. PLEASE LET ME KNOW WHAT PLACE I SHOULD LOOK AT.) |
| Q13 | OTEGARU HOMEPAGE WO SAKUSEI SHIYOU TO SHITEIRUNODESUGA, PASSWORD WO SETTEI SHITEMO, SHINKISAKUSEI WO SHITE HOZON WO SHITA ATO NO PASSWORD WO KINYU SURUTO AIMASEN. DOU SHITARA IINODESHOKA…. NARUBEKU HAYAKU HENTO SHITE ITADAKERU TO URESHIDESU.<br>(I AM ATTEMPTING TO CREATE A SIMPLE WEBSITE, BUT AFTER SETTING THE PASSWORD, AND NEWLY CREATING AND SAVING, THE "PASSWORD" DOES NOT MATCH. PLEASE LET ME KNOW WHAT I SHOULD DO. I WOULD APPRECIATE IT IF YOU COULD ANSWER THIS AS SOON AS POSSIBLE. ) |
| Q14 | MAIL PASSWORD WO HENKO SHIMASHITA. SOSHITARA HP NO TENSO GA UMAKU IKANAKU NARIMASHITA. TENSO HA next FTP DE OKONATTE IMASU. Next FTP NO HOST NO SETTEI NO PASSWORD HA ATARASHII MAIL PASSWORD NI SURUNODESHOKA.<br>(I HAVE CHANGED MY EMAIL PASSWORD. AFTER DOING THIS, WEBSITE TRANSFER NO LONGER WORKS PROPERLY. TRANSFERRING IS DONE BY next FTP. SHOULD THE PASSWORD FOR THE HOST SETTING OF nex tFTP BE MADE THE NEW EMAIL PASSWORD? ) |

FIG. 5A

| A_ID | TEXT CONTENTS |
|---|---|
| A1 | FTP ACCOUNT, FTP PASSWORD TOHA, HOMEPAGE SHINKI KAISETSU NO TOKI NI HAKKO SARETA MONODESU. FTP PASSWORD GA ERROR TO NATTE SHIMAU BAAI YA, FTP PASSWORD WO OWASURE NO BAAI HA, KAKI URL KARA, 「FTP PASSWORD SAIHAKKO」 TETSUZUKI WO OKONATTE KUDASAI.<br><FTP PASSWORD SAIHAKKO><br>http://XXXXXXXX/<br>(FTP ACCOUNT AND FTP PASSWORD WERE ISSUED WHEN SETTING UP A NEW WEBSITE. WHERE THE FTP PASSWORD PRODUCES AN ERROR OR YOU HAVE FORGOTTEN THE FTP PASSWORD, PLEASE FOLLOW THE PROCEDURE "RE-ISSUE FTP PASSWORD" FROM THE FOLLOWING URL:<br>"RE-ISSUE FTP PASSWORD"<br>http://XXXXXXXX/ ) |
| A2 | FILE GA TENSO DEKINAI BAAI HA KAKI JIKOU WO KANARAZU MEIKINO UE, SAIDO OTOIAWASE KUDASAIMASUYO ONEGAI ITASHIMASU.<br>・OKYAKUSAMA NO microbe ID(KAIINSHO KISAI NO,EIJI 3JI・SUUJI 5JI NO ID DESU).<br>・HOMEPAGE URL<br>・GOSHIYO NI NATTA FTP SOFT MEI<br>・JISSAINI NYURYOKU SARETA KOUMOKU(TADASHI, PASSWORD NO KISAI HA HUYO DESU.)<br>・ERROR MESSAGE GA DERU BAAI HA, SONO NAIYO<br>・Internet HENO SETSUZOKU KEITAI(ANALOG KAISEN, ISDN, LAN KEIYU....NADO)<br>・SONOTA KUWASHII JOKYO(GOKIBO)<br>(WHEN YOU CANNOT TRANSFER A FILE, PLEASE RE-SUBMIT AN ENQUIRY, ENSURING THAT THE FOLLOWING ITEMS ARE CLEARLY SPECIFIED:<br>- CUSTOMER MICROBE ID (THIS IS A3-LETTER, 5-NUMBER ID, AS WRITTEN ON MEMBER CARD)<br>- WEBSITE URL<br>- NAME OF FTP SOFTWARE USED<br>- ITEMS ACTUALLY INPUTTED (IT IS NOT NECESSARY TO WRITE PASSWORD)<br>- IN THE CASE OF AN ERROR MESSAGE, THE ERROR MESSAGE CONTENT<br>- CONNECTION MODE TO INTERNET(ANALOG LINE, ISDN, VIA LAN, ETC.)<br>- OTHER DETAILS (OPTIONAL)) |

FIG. 5B

| A_ID | TEXT CONTENTS |
|---|---|
| A3 | SERVER MEI HA XXXXXXXNI NARIMASUNODE TSUZURI NI GOCHUI KUDASAI.TENSO NI HITSUYONA SETTEI WO MATOMERUTO IKA NO YOU NI NARIMASU. IMA ICHIDO GOKAKUNIN NO UE, TENSO WO OTAMESHI KUDASAI.<br><SETTEIREI><br>TENSOSAKI SERVER MEI:XXXXXX<br>USER ID:FTP ACCOUNT<br>PASSWORD:FTP PASSWORD<br>TENSOSAKI HOLDER NO SETTEI:public_html<br>(THE SERVER NAME IS XXXXX. PLEASE TAKE CARE WITH THE SPELLING. SETTINGS REQUIRED FOR TRANSFER ARE SUMMARIZED AS FOLLOWS. PLEASE CHECK THIS INFORMATION BEFORE TRYING THE TRANSFER.<br>(SETTING EXAMPLE)<br>TRANSFER DESTINATION SERVER NAME: XXXXXXX<br>USER ID: FTP ACCOUNT<br>PASSWORD: FTP PASSWORD<br>TRANSFER DESTINATION FOLDER SETTING: public_html) |
| A4 | KAKI TEJUN NITE OTEGARU HOMEPAGE NO KANKYO SETTEI WO OKONATTE ITADAKI, PASSWORD NO NINSHO WO GOKAKUNIN KUDASAI. KAKI URL YORI 「SAKUSEI/HENSHU」WO CLICK SHIMASU.<br>http://XXXXXXXX/<br>「KANKYO SETTEI」WO CLICK SHIMASU.<br>FTP ACOUNT(HOMEPAGE ID) :FTP ACOUNT WO NYURYOKU<br>FTP PASSWORD(HP PASSWORD) :FTP PASSWORD WO NYURYOKU<br>PASSWORD WO KIOKU「SURU」NI CHECK WO IREMASITARA「SETTEI」WO CLICIK SHITE KUDASAI. JOKI NO TEJUN DE ERROR GA HASSEI SHINAI BAAI HA, PAGE NO SAKUSEI・HOZON HE OSUSUMI ITADAKI, ONAJI FTP PASSWORD DE HOZON WO OTAMESHI KUDASAI.<br>(PLEASE CARRY OUT THE ENVIRONMENT SETTING FOR THE SIMPLE WEBSITE ACCORDING TO THE FOLLOWING PROCEDURE, AND CONFIRM AUTHENTICATION OF PASSWORD. CLICK "CREATE/EDIT" FROM THE FOLLOWING URL:<br>http://XXXXXXXX/<br>CLICK "ENVIRONMENT SETTING"<br>FTP ACCOUNT (WEBSITE ID): INPUT FTP ACCOUNT<br>FTP PASSWORD (WEBSITE PASSWORD): INPUT FTP PASSWORD<br>AFTER PUTTING A CHECK MARK AT "SAVE" TO SAVE THE PASSWORD, PLEASE CLICK "SETTING". IF AN ERROR DOES NOT OCCUR IN THE ABOVE DESCRIBED PROCEDURE, PLEASE PROCEED TO CREATE AND SAVE PAGE, AND TRY TO SAVE WITH THE SAME FTP PASSWORD. ) |
| A5 | FTP NO SAINI SHIYO SURU PASSWORD HA, 「HOMEPAGE PASSWORD(FTP PASSWORD)」DESU. Internet SETSUZOKUYOH PASSWORD TOHA KOTONARIMASU.<br>(THE PASSWORD USED FOR FTP, IS "WEBSITE PASSWORD (FTP PASSWORD)". THIS IS DIFFERENT FROM THE PASSWORD FOR CONNECTING TO THE INTERNET.) |

FIG. 6

| QUESTION TEXT | ANSWER TEXT FOR QUESTION TEXT (CONSTITUENT ELEMENTS OF TEXT) |
|---|---|
| Q1 | A1 |
| Q2 | A1 |
| Q3 | A1 |
| Q4 | A1, A2 |
| Q5 | A1, A3 |
| Q6 | A1 |
| Q7 | A1 |
| Q8 | A1, A2 |
| Q9 | A1 |
| Q10 | A1 |
| Q11 | A1, A4 |
| Q12 | A1 |
| Q13 | A1 |
| Q14 | A1, A5 |

FIG. 7

| QUESTION TEXT SET | COMMON ANSWER TEXT FOR QUESTION TEXT SET |
|---|---|
| Q1, Q2, Q3, Q6, Q7, Q9, Q10, Q12, Q13 | A1 |
| Q4, Q8 | A1, A2 |
| Q5 | A1, A3 |
| Q11 | A1, A4 |
| Q14 | A1, A5 |

FIG. 8

| PARAPHRASE TEXT PAIRS |
| --- |
| (Q1_S1, Q1_S2) |
| (Q1_S1, Q10_S2) |
| (Q1_S2, Q10_S2) |
| (Q2_S1, Q3_S1) |
| (Q2_S1, Q6_S1) |
| (Q2_S1, Q9_S2) |
| (Q2_S1, Q10_S2) |
| (Q2_S1, Q12_S2) |
| (Q3_S1, Q6_S1) |
| (Q3_S1, Q9_S2) |
| (Q3_S1, Q12_S2) |
| (Q6_S1, Q9_S2) |
| (Q6_S1, Q10_S2) |
| (Q6_S1, Q12_S2) |
| (Q9_S2, Q10_S2) |
| (Q9_S2, Q12_S2) |

FIG. 9

| QUESTION TEXT |
|---|
| (Q1_S1) PASSWORD WO WASURE MASHIDA.<br><br>(I HAVE FORGOTTEN THE PASSWORD.) |
| (Q1_S2) BROWSER NI KIOKU SASETE IMASHITAGA, COOKY WO AYAMATTE SHOKYO SHITE SIMATTA TAMENI, PASSWORD WO WASURETE SHIMAIMASHITA.<br><br>(IT WAS SAVED IN THE BROWSER, BUT I DELETED THE COOKIES BY MISTAKE, AND SO I HAVE FORGOTTEN THE PASSWORD.) |
| (Q2_S1) FTP PASSSWORD GA WAKARANAI NO DESUGA...?<br><br>(I DON'T KNOW THE FTP PASSWORD ...?) |
| (Q3_S1) HOMEPAGE ID TO HP PASSWORD GA WAKARIMASEN.<br><br>(I DON'T KNOW THE WEBSITE ID AND WEBSITE PASSWORD. |
| (Q6_S1) HOMEPAGE WO SAKUSEI SHITANODESUGA FTP PASSWORD GA WAKARANAI NODESU.<br><br>(I HAVE CREATED A WEBSITE, BUT I DO NOT KNOW THE FTP PASSWORD. |
| (Q9_S2) HOMEPAGE ID TO FTP PASSWORD GA WAKARANAI NODESU.<br><br>(I DO NOT KNOW THE WEBSITE ID AND FTP PASSWORD.) |
| (Q10_S2) OKINIORI GALLAERY SET WO KONYU SITA NODESUGA FTP PASSWORD WO WASURETE SHIMATTANODE KANKYO SETTEI GA DEKIMASEN.<br><br>(I BOUGHT THE FAVORITE GALLERY SET, BUT I HAVE FORGOTTEN THE FTP PASSWORD SO I CANNOT DO THE ENVIRONMENT SETTING.) |
| (Q12_S2) SONOTAME, PASSWORD GA WAKARIMASEN!<br><br>(SO I DON'T KNOW THE PASSWORD!) |

FIG. 10

| Q1_S1 | ⇔ | Q1_S2 |
|---|---|---|
| Φ | ⇔ | /BROWSER /NI(1) /KIOKU(STORE)/SASETE(2) /IMASHITA(3) /GA(4) /, /COOKIE /WO(5) /AYAMA(MISTAKENLY) /TTE(7) /SHOKYO(DELETED) /SHITE(8) /SHIMATTA(9) /TAME(10) /NI(11) /, / |
| /PASSWORD / | ⇔ | /PASSWORD / |
| /WO(5) / | ⇔ | /WO(5) / |
| /WASURE(FORGET)(7) / | ⇔ | /WASURE(7) TE /SHIMAI(12) |
| /MASHI (13) / | ⇔ | /MASHI (13) / |
| /TA (14)/   (PAST) | ⇔ | /TA (14)/   (PAST) |
| /. / | ⇔ | /. / |

(1) Japanese preposition
(2) part of Japanese verb
(3) part of Japanese verb
(4) Japanese subject marker
(5) Japanese object marker
(7) main part of Japanese verb
(8) part of Japanese verb
(9) main part of Japanese verb
(10) part of Japanese conjunction
(11) part of Japanese conjunction in this case
(12) part of Japanese verb (HAVE: PRESENT PERFECT TENSE)
(13) part of Japanese verb
(14) Japanese proverb (PAST TENSE)

FIG. 11

| Q1_S1 | ⟺ | Q10_S2 |
|---|---|---|
| φ | ⟺ | /OKINIIRI(FAVORTE)/ /GALLERY SET /WO(5) /KONYU(PURCHASE) /SHITA(15) /NO(16) /DESU(17) /GA(4)/ |
| /PASSWORD / | ⟺ | /FTP /PASSWORD / |
| /WO(5) / | ⟺ | /WO(5) / |
| /WASURE(FORGET) / | ⟺ | /WASURE(FORGET) / |
| /MASHI (13) / | ⟺ | /TE(7) /SHIMAT(18) |
| /TA (14)/ | ⟺ | /TA (14)/ |
| φ | ⟺ | /NODE(SO) / KANKYO SETTEI (ENVIRONMENT SETTING) /GA(4)/DEKI (COULD) /MASENN(NOT) / |
| /. / | ⟺ | /. / |

(5) Japanese object marker
(15) part of Japanese verb
(16) particle complementing Japanese verb in this case
(17) part of Japanese verb
(4) Japanese subject marker
(13) part of Japanese verb
(7) part of Japanese verb
(18) part of Japanese verb (HAVE: PRESENT PERFECT TENSE)
(14) Japanese proverb (PAST TENSE)

FIG. 12

| Q2_S1 | ⟺ | Q6_S1 |
|---|---|---|
| φ | ⟺ | /HOME PAGE(WEBSITE) /WO(5) /SAKUSEI(CREATE) /SHITA(15) /NO(16) /DESU(17) /GA(4)/ |
| /FTP /PASSWORD / | ⟺ | /FTP /PASSWORD / |
| /GA(4) / | ⟺ | /GA(4) / |
| /WAKARA(UNDERSTAND) /NAI(NOT) / | ⟺ | /WAKARA(UNDERSTAND) /NAI(NOT) / |
| /NO (16)/ | ⟺ | /NO (16)/ |
| /DESU(17) / | ⟺ | /DESU(17) / |
| /GA(4) /... /? / | ⟺ | /. / |

(5) Japanese object marker
(15) part of Japanese verb (DID: PAST TENSE)
(16) particle complementing Japanese verb
(17) part of Japanese verb
(4) Japanese subject marker

FIG. 13

| Q2_S1 | ⇔ | Q9_S2 |
|---|---|---|
| の | ⇔ | /HOME PAGE(WEBSITE) /ID /TO(AND) / |
| /FTP /PASSWORD / | ⇔ | /FTP /PASSWORD / |
| /GA(4) / | ⇔ | /GA(4) / |
| /WAKARA(UNDERSTAND) / | ⇔ | /WAKARA(UNDERSTAND) / |
| /NAI(NOT) / | ⇔ | /NAI(NOT) / |
| /NO(16) /DESU(17) / | ⇔ | /DESU(17) / |
| /GA(4) /... /? / | ⇔ | /. / |

(4) Japanese subject marker
(16) particle complementing Japanese verb in this case
(17) part of Japanese verb

FIG. 14

| Q2_S1 | ⇔ | Q10_S2 |
|---|---|---|
| Φ | ⇔ | /OKINIIRI(FAVORITE) /GALLERY SET /WO(5) /KONYU(PURCHASE) /SHITA(15) /NO(16) /DESU(17) /GA(4)/ |
| /FTP / | ⇔ | /FTP / |
| /PASSWORD / | ⇔ | /PASSWORD / |
| /GA(4) / | ⇔ | /WO(5) / |
| /WAKARA(UNDERSTAND) /NAI(NOT) / | ⇔ | /WASURE(FORGET) /TE(7) / SHIMAT(18) / TA(14) |
| /NO(16) / | ⇔ | /NO(19) / |
| /DESU(17) / | ⇔ | /DE(20) / |
| Φ | ⇔ | /KANKYO SETTEI (ENVIRONMENT SETTING) /GA(4) /DEKI(COULD) /MASENN(NOT) / |
| /GA(4) /... /? / | ⇔ | /. / |

(5) Japanese object marker
(15) part of Japanese verb (DID: PAST TENSE)
(16) particle complementing Japanese verb in this case
(17) part of Japanese verb
(4) Japanese subject marker
(7) part of Japanese verb
(18) part of Japanese verb (HAVE: PRESENT PERFECT TENSE)
(14) Japanese proverb (PAST TENSE)
(19) part of Japanese conjunction in this case ⎫
(20) part of Japanese conjunction in this case ⎭  =BECAUSE

FIG. 15

| Q2_S1 | ⇔ | Q12_S2 |
|---|---|---|
| Φ | ⇔ | /SONOTAME(THEREFORE) / ,/ |
| /FTP /PASSWORD / | ⇔ | /PASSWORD / |
| /GA(4) / | ⇔ | /GA(4) / |
| /WAKARA(UNDERSTAND) /NAI(NOT) /NO(16) /DESU(17) / | ⇔ | /WAKARI(UNDERSTAND) MASEN(NOT) / |
| /GA(4) /... /? / | ⇔ | /! / |

(4) Japanese subject marker
(16) particle complementing Japanese verb in this case
(17) part of Japanese verb

FIG. 16

| PARAPHRASE TEXT PAIRS |
| --- |
| (Q1_S1, Q1_S2) |
| (Q1_S1, Q10_S2) |
| (Q1_S2, Q10_S2) |
| (Q2_S1, Q3_S1) |
| (Q2_S1, Q6_S1) |
| (Q2_S1, Q9_S2) |
| (Q2_S1, Q10_S2) |
| (Q2_S1, Q12_S2) |
| (Q3_S1, Q6_S1) |
| (Q3_S1, Q9_S2) |
| (Q3_S1, Q12_S2) |
| (Q6_S1, Q9_S2) |
| (Q6_S1, Q10_S2) |
| (Q6_S1, Q12_S2) |
| (Q9_S2, Q10_S2) |
| (Q9_S2, Q12_S2) |
| (Q4_S1, Q8_S1) |

FIG. 17

| QUESTION TEXT |
|---|
| (Q4_S1) TENSO NI SHITA TOKI FTP PASSWORD GA TADASHIKUNAI TO ITTE KIMASHITA.<br>    (WHEN I SENT THE FTP PASSWORD IT WAS REJECTED AS BEING INCORRECT. ) |
| (Q8_S1) HOMEPAGE NO ID MATAHA PASSWORD GA CHIGAI MASUNODE TENSO GA DEKIMASEN.<br>    (THE OUTPUT SAYS THAT THE WEBSITE ID OR PASSWORD IS WRONG, AND TRANSMISSION IS NOT POSSIBLE.) |

FIG. 18

| Q4_S1 | ⇔ | Q8_S1 |
|---|---|---|
| /TENSO(SEND) /NI(21) /SHITA(15) /TOKI(WHEN) / | ⇔ | /TENSO(SENDING) /GA(4)/ |
| φ | ⇔ | /WEBSITE /OF /ID /OR / |
| /FTP /PASSWORD / | ⇔ | /PASSWORD / |
| /GA(4) / | ⇔ | /GA(4) / |
| /TADASHIKUNAI (INCORRECT) / | ⇔ | /CHIGAIMASU(NOT CORRECT) / |
| /TO(THAT) / | ⇔ | /TO(THAT) / |
| /ITTE(SAID) / | ⇔ | /DERU(OUTPUTTED) /NODE(SINCE) / |
| /KYOHI(REJECT) /SARE(22) /MASHITA(23) | ⇔ | /DEKI(CAN) /MASEN(NOT) / |
| /. / | ⇔ | /. / |

(21) Japanese particle
(15) part of Japanese verb in this case (DID: PAST TENSE)
(4) Japanese subject marker
(22) part of Japanese verb in this case
(23) part of Japanese verb in this case (DID: PAST TENSE)

FIG. 19

NYURYOKU SITSUMON BUN Q_IN
(INPUTTED QUESTION TEXT Q_IN)

TENSO SURU TOKINI PASSWORD WO IREMASHITAGA「PASSWORD GA CHIGAIMASU」NO ERROR MESSAGE GA DERUNODE DEKIMASEN.
(WHEN THE PASSWORD WAS SENT I INPUTTED IT, BUT AN ERROR MESSAGE OF "INCORRECT PASSWORD" WAS OUTPUTTED AND IT DID NOT WORK. )

FIG. 20A

| SCORE | PARAPHRASE CANDIDATES WITH RESPECT TO INPUTTED QUESTION TEXT Q_IN |
|---|---|
| -0.134 | TENSO SURUTOKINI FTP PASSWORD WO IREMASHITAGA 「PASSWORD GA CHIGAIMASU」NO ERROR MESSAGE GA DERUNODE DEKIMASEN.<br>(WHEN THE FTP PASSWORD WAS SENT I INPUTTED IT, BUT AN ERROR MESSAGE OF "INCORRECT PASSWORD" WAS OUTPUTTED AND IT DOES NOT WORK.9 |
| -0.134 | TENSO SURUTOKINI PASSWORD WO IREMASHITAGA 「FTP PASSWORD GA CHIGAIMASU」NO ERROR MESSAGE GA DERUNODE DEKIMASEN.<br>(WHEN THE PASSWORD WAS SENT I INPUTTED IT, BUT AN ERROR MESSAGE OF "INCORRECT FTP PASSWORD" WAS OUTPUTTED AND IT DOES NOT WORK. |
| -0.243 | TENSO SURUTOKINI FTP PASSWORD WO IREMASHITAGA 「FTP PASSWORD GA CHIGAIMASU」NO ERROR MESSAGE GA DERUNODE DEKIMASEN.<br>(WHEN THE FTP PASSWORD WAS SENT I INPUTTED IT, BUT AN ERROR MESSAGE OF "INCORRECT FTP PASSWORD" WAS OUTPUTTED AND IT DOES NOT WORK. |
| -0.329 | TENSO SURUTOKINI FTP PASSWORD WO IREMASHITAGA 「PASSWORD GA CHIGAIMASU」NO ERROR MESSAGE GA DERUNODE DEKIMASENGA... ?<br>(WHEN THE FTP PASSWORD WAS SENT I INPUTTED IT, BUT AN ERROR MESSAGE OF "INCORRECT PASSWORD" WAS OUTPUTTED, AND IT DOES NOT WORK ... |
| -0.329 | TENSO SURUTOKINI PASSWORD WO IREMASHITAGA 「FTP PASSWORD GA CHIGAIMASU」NO ERROR MESSAGE GA DERUNODE DEKIMASENGA... ?<br>(WHEN THE PASSWORD WAS SENT I INPUTTED IT, BUT AN ERROR MESSAGE OF "INCORRECT FTP PASSWORD" WAS OUTPUTTED, AND IT DOES NOT WORK ... |
| -0.472 | TENSO SURUTOKINI FTP PASSWORD WO IREMASHITAGA 「FTP PASSWORD GA CHIGAIMASU」NO ERROR MESSAGE GA DERUNODE DEKIMASENGA... ?<br>(WHEN THE FTP PASSWORD WAS SENT I INPUTTED IT, BUT AN ERROR MESSAGE OF "INCORRECT FTP PASSWORD" WAS OUTPUTTED, AND IT DOES NOT WORK |
| -0.249 | PASSWORD WO IREMASHITAGA 「PASSWORD GA CHIGAIMASU」NO ERROR MESSAGE GA DERUNODE TENSO GA DEKIMASEN.<br>(I INPUTTED THE PASSWORD, BUT AN ERROR MESSAGE OF "INCORRECT PASSWORD" WAS OUTPUTTED, AND I CANNOT SEND. |
| -0.393 | FTP PASSWORD WO IREMASHITAGA 「PASSWORD GA CHIGAIMASU」NO ERROR MESSAGE GA DERUNODE DEKIMASEN.<br>(I INPUTTED THE FTP PASSWORD, BUT AN ERROR MESSAGE OF "INCORRECT PASSWORD" WAS OUTPUTTED, AND I CANNOT SEND. |
| -0.393 | PASSWORD WO IREMASHITAGA 「FTP PASSWORD GA CHIGAIMASU」NO ERROR MESSAGE GA DERUNODE TENSO GA DEKIMASEN.<br>(I INPUTTED THE PASSWORD, BUT AN ERROR MESSAGE OF "INCORRECT FTP PASSWORD" WAS OUTPUTTED, AND I CANNOT SEND. |

FIG. 20B

| SCORE | PARAPHRASE CANDIDATES WITH RESPECT TO INPUTTED QUESTION TEXT Q_IN |
|---|---|
| -0.430 | FTP  PASSWORD WO IREMASHITAGA 「FTP PASSWORD GA CHIGAIMASU」NO ERROR MESSAGE GA DERUNODE TENSO GA DEKIMASEN.<br>(I INPUTTED THE FTP PASSWORD, BUT AN ERROR MESSAGE OF "INCORRECT FTP PASSWORD" WAS OUTPUTTED, AND I CANNOT SEND. |
| -0.487 | PASSWORD WO IREMASHITAGA「PASSWORD GA CHIGAIMASU」NO ERROR MESSAGE GA DERUNODE TENSO DEKIMASENGA...?<br>(I INPUTTED THE PASSWORD, BUT AN ERROR MESSAGE OF "INCORRECT PASSWORD" WAS OUTPUTTED, AND I CANNOT SEND... |
| -0.537 | FTP PASSWORD WO IREMASHITAGA 「PASSWORD GA CHIGAIMASU」NO ERROR MESSAGE GA DERUNODE TENSO GA DEKIMASENGA...?<br>(I INPUTTED THE FTP PASSWORD, BUT AN ERROR MESSAGE OF "INCORRECT PASSWORD" WAS OUTPUTTED, AND I CANNOT SEND... |
| -0.537 | PASSWORD WO IREMASHITAGA 「 FTP PASSWORD GA CHIGAIMASU」NO ERROR MESSAGE GA DERUNODE TENSO GA DEKIMASENGA...?<br>(I INPUTTED THE PASSWORD, BUT AN ERROR MESSAGE OF "INCORRECT FTP PASSWORD" WAS OUTPUTTED, AND I CANNOT SEND... |
| -0.595 | FTP PASSWORD WO IREMASHITAGA 「FTP PASSWORD GA CHIGAIMASU」NO ERROR MESSAGE GA DERUNODE TENSO GA DEKIMASENGA...?<br>(I INPUTTED THE FTP PASSWORD, BUT AN ERROR MESSAGE OF "INCORRECT FTP PASSWORD" WAS OUTPUTTED, AND I CANNOT SEND... |

TEXT PARAPHRASING METHOD AND PROGRAM, CONVERSION RULE COMPUTING METHOD AND PROGRAM, AND TEXT PARAPHRASING SYSTEM

RELATED APPLICATION

This application is a National Stage of International Application No. PCT/JP2007/074628, filed Dec. 21, 2007, which claims the benefit of the priority of earlier Japanese Patent Application No. 2006-345757, filed on Dec. 22, 2006, the disclosure of which is incorporated herein in its entirety by reference thereto.

TECHNICAL FIELD

The present invention relates to a text paraphrasing method, a conversion rule computing method, a text paraphrasing system, a conversion rule computing program, and a text paraphrasing program, and in particular, relates to a text paraphrasing method, a conversion rule computing method, a text paraphrasing system, a conversion rule computing program, and a text paraphrasing program for learning a rule for paraphrasing text.

BACKGROUND ART

Machine translation in which a computer converts text (sentence) inputted by a human into a text (sentence) in a language of another country is widely used, but in cases dealing with conversion within the same language, a text (sentence) paraphrasing method for converting a text (sentence) expression is used (refer to Non-Patent Document 1).

Non-Patent Document 1 describes one example of a conventional text paraphrasing expression creating method. The text paraphrasing expression creating method described in Non-Patent Document 1 is a method in which a human creates in advance a paraphrasing rule expressed by syntactic features (properties). Ultimately confirmation by a human is required for an obtained paraphrase expression.

In addition, with regard to a text paraphrasing method, a question and answer system that automatically outputs an answer with respect to a converted question, or the like, is also used (refer to Patent Document 1). For example, Patent Document 1 describes one example of a text paraphrase expression creating method for obtaining a text (sentence) paraphrase model by machine learning from a paraphrase corpus. In the text paraphrase expression creating method described in Patent Document 1, a plurality of explanatory texts with respect to the same headline in a newspaper article or a dictionary are regarded as different text pairs in which description contents match. That is, a paraphrase corpus is created by regarding the explanatory texts with respect to the same headline as text (sentence) pairs in a paraphrase relationship, and machine learning is performed thereon.
[Non-Patent Document 1]
Fujita, Atsushi, et al., "A Class-oriented Approach to Building a Paraphrase Corpus", Proceedings of the 3rd International Workshop on Paraphrasing (IWP), October, 2005, pp. 25-32.
[Patent Document 1]
JP Patent Kokai Publication No. JP-P2002-014990A (paragraphs 0058-0059, FIG. 4).

SUMMARY

The entire disclosures of the abovementioned Non-Patent Document 1 and Patent Document 1 are incorporated herein by reference thereto.

However, in cases where the conventional text paraphrase expression creating method is applied to question texts inputted by a plurality of users, in a method of creating a paraphrase rule by a human (for example, the text paraphrase expression creating method described in Non-Patent Document 1), it is necessary to perform an enormous amount of rule creation. This is because it is necessary to realize sufficient comprehensiveness with regard to content and expression of varieties of question text. In addition, since a confirmation operation by a human is necessary when obtaining a final paraphrase expression, there are many cases where question text inputted by a user cannot be applied to a system that carries out processing in real time.

Furthermore, in the text paraphrase expression creating method described in Patent Document 1, it is difficult to obtain learning data for fields that are not encompassed in existing dictionary indexes, newspaper articles or the like. Moreover, if a text pair with no relationship to paraphrasing of an expression is included among learning data, this becomes noise (unnecessary information) when learning. In such situations, there are cases where, according to the quality of the learning data, a suitable text paraphrase model (paraphrase rule; referred to below as a paraphrase model) cannot be obtained. That is, in a method of machine learning from existing dictionary or newspaper article data, as described in Patent Document 1, since the encompassed question texts are limited to content related to the existing dictionary or newspaper article data, there are cases where it is not possible to realize sufficient comprehensiveness with regard to users' varied question texts. Furthermore, a text (sentence) pair refers to a combination (2 texts, one set) of two texts (sentences).

Therefore, it is an object of the present invention to provide, for question text input by a user, a text paraphrasing method, a conversion rule computing method, a text paraphrasing system, a conversion rule computing program, and a text paraphrasing program, for generating a paraphrase expression in real time, and in particular, it is an object to provide a text paraphrasing method, a conversion rule computing method, a text paraphrasing system, a conversion rule computing program, and a text paraphrasing program in which it is possible to learn a paraphrase model of a question text inputted by the user.

According to a first aspect of the present invention, there is provided a text paraphrasing method for generating, with respect to a question text inputted by a user, a question text of different expression but the same content. The method comprises: extracting a combination of sentences having a degree of similarity greater than or equal to a set threshold, from among question texts having the same answer texts stored in a storage unit, termed "first sentence extraction step"; computing a conversion rule for converting from the combination of sentences extracted in the first sentence extraction step to a sentence of the same content but different expression, termed "conversion rule computation step"; extracting again from the storage unit a combination of sentences having a degree of similarity greater than or equal to the threshold, using the conversion rule computed in the conversion rule computation step, termed "second sentence extraction step"; judging whether or not all of the combinations of sentences extracted in the first and the second sentence extraction steps match, termed "judging step"; and generating a paraphrase text of the inputted question text, using the conversion rule computed in the conversion rule computation step, termed "text generation step"; wherein execution of the first sentence extraction step, the conversion rule computation step, and the second sentence extraction step is repeated until it is judged that the combinations of sentences extracted in the first and the second sentence extraction steps all match.

The abovementioned text paraphrasing method preferably includes a step of displaying a generated paraphrase text to a user, and of displaying the generated paraphrase text together with a value indicating the degree of similarity with respect to the inputted question text.

Furthermore, it is possible to include, in the text generation step in the abovementioned text paraphrasing method, decomposing the inputted question text into a word string; comparing the conversion rule computed in the conversion rule computation step and the word string, and selecting a plurality of word strings with high degrees of similarity; termed "selection step"; and sorting the word strings selected in the selection step.

According to a second aspect of the present invention, there is provided a conversion rule computing method for computing, with respect to a question text inputted by a user, a conversion rule for generating a question text of different expression but the same content. The conversion rule computing method includes extracting a combination of sentences having a degree of similarity greater than or equal to a set threshold, from among question texts having the same answer texts stored in a storage unit, termed "first sentence extraction step"; computing a conversion rule for converting from the combination of sentences extracted in the first sentence extraction step to a sentence of the same content but different expression, termed "conversion rule computation step"; extracting again from the storage unit a combination of sentences having a degree of similarity greater than or equal to the threshold, using the conversion rule computed in the conversion rule computation step, termed "second sentence extraction step", and judging whether or not all of the combinations of sentences extracted in the first and the second sentence extraction steps match, termed "judging step"; wherein execution of the first sentence extraction step, the conversion rule computation step, and the second sentence extraction step is repeated until it is judged that the combinations of sentences extracted in the first and the second sentence extraction steps all match.

In the abovementioned conversion rule computing method, it is possible to store, in a storage unit, a question text inputted by input unit, an answer text with respect to the question text, and information indicating a correspondence relationship of the question text and the answer text; to apply the information to one group in which answer texts of the same content are collected; and to generate a group of question texts corresponding to answer texts of the same content.

The abovementioned conversion rule computing method can include updating information stored in the storage unit. In such cases, at an occasion at which the information in the storage unit is updated, processing may be started in the first sentence extraction step.

According to a third aspect of the present invention, there is provided a text paraphrasing system that generates, with respect to a question text inputted by a user, a question text of different expression but the same content. The text paraphrasing system is provided with an input unit; a storage unit storing the question text inputted to the input unit and an answer text with respect to the question text; a sentence extracting unit extracting a combination of sentences having a degree of similarity greater than or equal to a set threshold, from among question texts having the same answer texts stored in the storage unit; a conversion rule computing unit computing a conversion rule for converting from the combination of sentences extracted in the sentence extracting unit to a sentence of the same content but different expression; and a text generating unit generating a paraphrase text of the question text inputted to the input unit by the user, using a conversion rule computed by the conversion rule computing unit.

The storage unit in the abovementioned text paraphrasing system preferably includes first storage unit storing a question text inputted to the input unit and the answer text with respect to a question text, a second storage unit storing the combination of sentences extracted by the sentence extracting unit, and a third storage unit storing the conversion rule computed by the conversion rule computing unit.

Furthermore, the conversion rule in the abovementioned text paraphrasing system can include at least a translation model, a language model, and a word string.

Furthermore, in the abovementioned text paraphrasing system it is possible to provide a display unit displaying the paraphrase text generated by the text generating unit. The display unit may display the paraphrase text generated by the text generating unit together with a value indicating a degree of similarity with a question text inputted to the input unit by the user.

Furthermore, in the abovementioned text paraphrasing system, it is possible to provide an information updating unit updating information in the storage unit, according to a command inputted to the input unit. The information updating unit can be configured so as to transmit a signal for starting extraction of a combination of sentences, when the information in the storage unit is updated, to the sentence extracting unit.

Furthermore, in the abovementioned text paraphrasing system it is possible to create a question text set corresponding to the same answer texts from correspondence relationships of question texts inputted by the user in the past and an answer text with respect to each question text, to be used as learning data for text paraphrasing. Even with question texts corresponding to the same answer text, since there is no guarantee that texts necessarily have a paraphrase relationship, due to differences in knowledge of the field of users who created each of the texts, problem understanding level, and of intention and strategy, in order to sift (sort) only items that have a paraphrase relationship from among all text pairs in the question text sets, the text paraphrasing system performs extraction of text pairs that are in a paraphrase relationship according to a paraphrase model (for example, Equation (I) and the like, described below). Learning of the paraphrase model is further performed with these extracted paraphrase text pairs (for example, text pairs shown in FIG. 8) as the learning data. In the paraphrase text pairs, two processes of: extraction of the paraphrase text pairs according to the paraphrase model and learning of the paraphrase model with respect to the extracted paraphrase text pairs are repeated alternately until extracted text sets (extracted paraphrase text pairs) converge (i.e., paraphrase text pairs extracted using a newly learned paraphrase model become the same as paraphrase text pairs extracted using a paraphrase model learned before this), and the final paraphrase model is obtained. According to the abovementioned type of sequential processing, since it is possible to extract text pairs that have a paraphrase text relationship, from among question text sets corresponding to the same answer texts, it is possible to learn an appropriate paraphrase model with these as learning data.

By performing the abovementioned type of learning, the abovementioned question text paraphrasing system can automatically generate an answer text with regard to a question text received by mail, for example. That is, when a customer makes enquiries with various expressions, it is possible to generate various paraphrases with regard to those expressions, so as to make a collation. Therefore, if the question text and the answer text pair are held in advance, it is possible to automatically assign (or allocate) the answer text, despite differences in the expressions of the enquires.

Furthermore, the abovementioned text paraphrasing method can be used, for example, for automatic generation of response record. That is, in cases where the answer text (answer email, or speech answered by an operator on a telephone and rendered into text by speech recognition or the like) and response record thereto (record in which content of the operator's response is summarized) are accumulated in the text paraphrasing system, by learning a model of paraphrasing from this answer text to the response record, it is possible to realize automatic generation of the response record.

According to a fourth aspect of the present invention, a conversion rule computing program for computing, with respect to a question text inputted by a user, a conversion rule for generating a question text of different expression but the same content. The conversion rule computing program is provided for executing, on a computer: a first sentence extracting process of extracting a combination of sentences having a degree of similarity greater than or equal to a set threshold, from among question texts having the same answer texts stored in storage unit; a conversion rule computing process of computing a conversion rule for converting from the combination of sentences extracted in the first sentence extraction step to a sentence of the same content but different expression; a second sentence extracting process of extracting again from the storage unit a combination of sentences having a degree of similarity greater than or equal to the threshold, using the conversion rule computed in the conversion rule computing process; and a judging process of judging whether or not all of the combinations of sentences extracted in the first and the second sentence extracting processes match; wherein the first sentence extracting process, the conversion rule computing process, and the second sentence extracting process are repeated until it is judged that the combinations of sentences extracted in the first and the second sentence extracting processes all match.

In the abovementioned conversion rule computing program, it is possible to execute on a computer, with respect to the storage unit that stores the question text inputted by input unit, the answer text with respect to the question text, and information indicating a correspondence relationship of the question text and the answer text, a process of applying the information to one group in which answer texts of the same content are collected, and of generating a group of question texts corresponding to answer texts of the same content.

Furthermore, the abovementioned conversion rule computing program may execute on a computer, a process of updating information stored in the storage unit, and, at an occasion at which the information in the storage unit is updated, a process of starting the first sentence extracting process.

According to a fifth aspect of the present invention, there is provided a text paraphrasing program for generating, with respect to a question text inputted by a user, a question text of different expression but the same content. The text paraphrasing program executes on a computer: a first sentence extracting process of extracting a combination of sentences having a degree of similarity greater than or equal to a set threshold, from among question texts having the same answer texts stored in a storage unit; a conversion rule computing process of computing a conversion rule for converting from the combination of sentences extracted in the first sentence extracting process to a sentence of the same content but different expression; a second sentence extracting process of extracting again from the storage unit a combination of sentences having a degree of similarity greater than or equal to the threshold, using the conversion rule computed in the conversion rule computing process; a judging process of judging whether or not all of the combinations of sentences extracted in the first and the second sentence extracting processes match; a process of repeating the first sentence extracting process, the conversion rule computing process, and the second sentence extracting process until it is judged that the combinations of sentences extracted in the first and the second sentence extracting processes all match; and a text generating process of generating a paraphrase text of the inputted question text, using the conversion rule computed by the conversion rule computing process.

The abovementioned text paraphrasing program can execute on a computer a process of displaying the generated paraphrase text together with a value indicating the degree of similarity with respect to the inputted question text.

Furthermore, the abovementioned text paraphrasing program can execute on a computer, in the text generating process, a process of decomposing the inputted question text into a word string; a selection step of comparing the conversion rule computed in the conversion rule computing process and the word string, and selecting a plurality of word strings with high degrees of similarity; and a sorting process of sorting the word strings selected in the selecting process.

According to the present invention, it is possible to learn a question text paraphrase model from correspondence relationships of question texts inputted by a user in the past and an answer text with respect to each question text. The reason for this is because of the introduction of a sequential process of learning the paraphrase model while at the same time gradually (stepwise) removing question text pairs having no relationship with the paraphrase texts, to raise accuracy of the paraphrase model. By doing this, it is possible to extract, with good accuracy, text pairs having relationships with the paraphrase texts, from among the question text set corresponding to the same answer texts.

BRIEF DESCRIPTION OF THE DRAWINGS

FIG. 4 is a descriptive diagram showing one example of a question text set stored in text set storage unit.

FIG. 5 is a descriptive diagram showing one example of answer texts with respect to each question text shown in FIG. 4.

FIG. 6 is a descriptive diagram showing correspondence relationships between each question text in FIG. 4 and the answer texts in FIG. 5.

FIG. 7 is a descriptive diagram showing relationships of question text sets corresponding to the same answer texts, created from the correspondence relationships of FIG. 6.

FIG. 8 is a descriptive diagram showing one example of paraphrase text pairs extracted by text pair extracting unit.

FIG. 9 is a descriptive diagram showing one example of text of each question text corresponding to the paraphrase text pairs shown in FIG. 8.

FIG. 10 is a descriptive diagram showing a result of alignment executed by model learning unit with respect to a paraphrase text pair (Q1_S1, Q1_S2).

FIG. 11 is a descriptive diagram showing a result of alignment executed by the model learning unit with respect to a paraphrase text pair (Q1_S1, Q10_S2).

FIG. 12 is a descriptive diagram showing a result of alignment executed by the model learning unit with respect to a paraphrase text pair (Q2_S1, Q6_S1).

FIG. 13 is a descriptive diagram showing a result of alignment executed by the model learning unit with respect to a paraphrase text pair (Q2_S1, Q9_S2).

FIG. 14 is a descriptive diagram showing a result of alignment executed by the model learning unit with respect to a paraphrase text pair (Q2_S1, Q10_S2).

FIG. 15 is a descriptive diagram showing a result of alignment executed by the model learning unit with respect to a paraphrase text pair (Q2_S1, Q12_S2).

FIG. 16 is a descriptive diagram showing one example of paraphrase text pairs extracted by the text pair extracting unit.

FIG. 17 is a descriptive diagram showing one example of question texts corresponding to a newly added text pair (Q4_S1, Q8_S1).

FIG. 18 is a descriptive diagram showing a result of alignment executed by the model learning unit with respect to a paraphrase text pair (Q4_S1, Q8_S1).

FIG. 19 is a descriptive diagram showing one example of a question text inputted to input unit.

FIG. 20 is a descriptive diagram showing one example of a paraphrase candidates generated by candidate generating unit using a paraphrase model.

Figure 1:
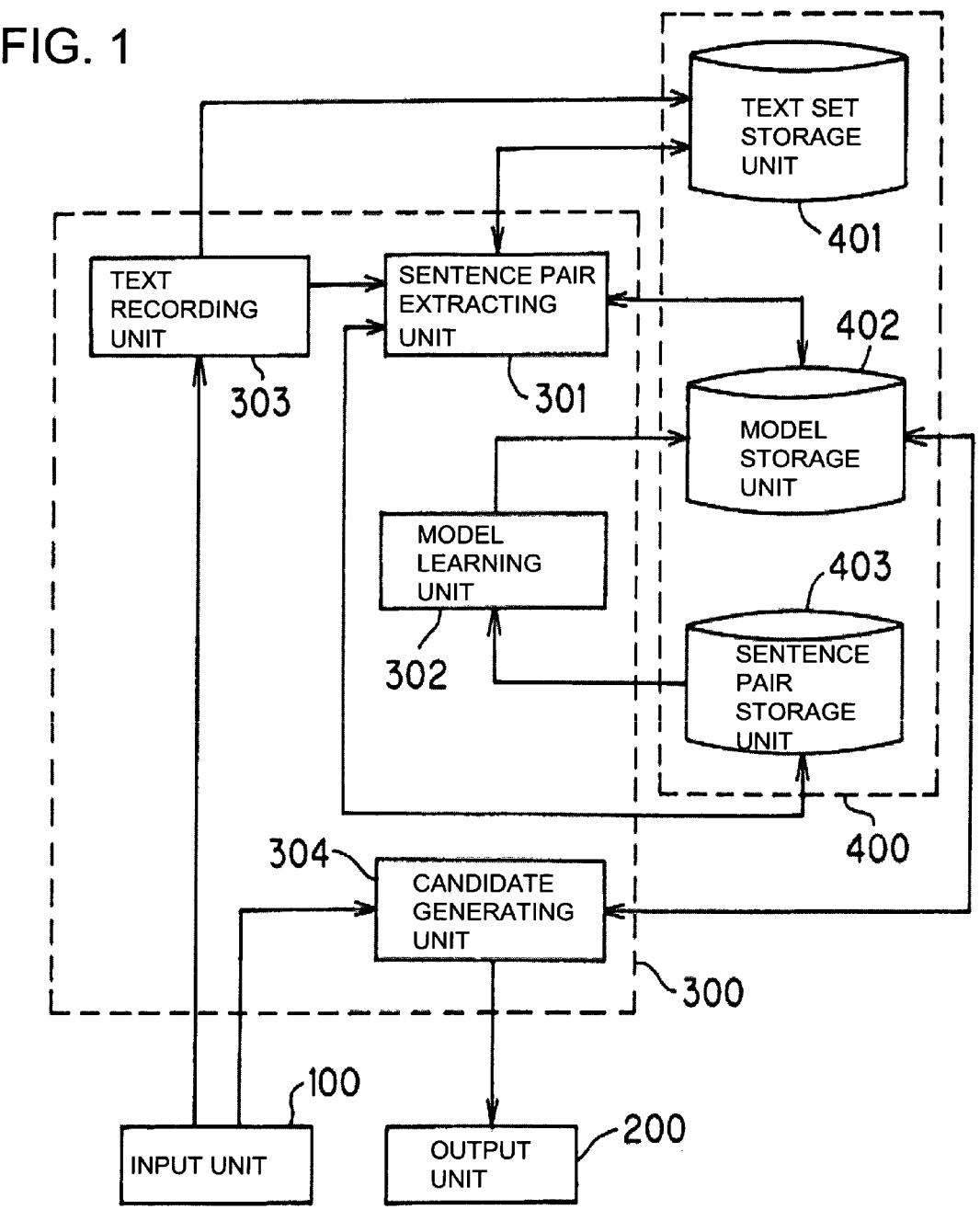
FIG. 1 is a system configuration diagram showing one example of a text paraphrasing system according to the present invention.

EXPLANATIONS OF SIGNS 100 input unit
200 output unit
300 data processing device
301 text (sentence) pair extracting unit
302 model learning unit
303 text recording unit
304 candidate generating unit
400 storage unit
401 text (sentence) set storage unit
402 model storage unit
403 text (sentence) pair storage unit

PREFERRED MODES FOR CARRYING OUT THE INVENTION

Below, an exemplary embodiment of the present invention is described, making reference to the drawings. FIG. 1 is a system configuration diagram showing one example of a text paraphrasing system according to the present invention. The text paraphrasing system is provided with input unit 100, output unit 200, a data processing device 300 that operates by program control, and storage unit 400. The text paraphrasing system in the present exemplary embodiment generates, in real time, paraphrase candidates for question texts inputted to the input unit 100, using a question text paraphrase model stored in the storage unit 400. Below, a description is given concerning cases where text inputted to the input unit 100 is question text.

The input unit 100 is realized, for example, by a keyboard, a mouse, or the like, for inputting text or the like. The input unit 100 has a function of outputting an input signal in response to a user operation, to the data processing device 300.

The output unit 200 is realized by a liquid crystal display device. Paraphrase candidates for question texts generated by the data processing device 300, for example, are displayed in the output unit 200.

The data processing device 300 includes text pair extracting unit 301, model learning device 302, text recording unit 303, and candidate generating unit 304. The data processing device 300 is realized, for example, by a CPU and peripheral circuits, which are not shown in the drawings. The data processing device 300 operates by program control, and generates the paraphrase candidates for question texts inputted to the input unit 100.

The text pair extracting unit 301 has a function of judging whether or not each text (sentence) pair have a paraphrase text (sentence) pair relationship, with regard to all text pairs in a set of question texts stored in the storage unit 400 described below. Specifically, the text pair extracting unit 301 judges, for all text pairs in the question text (sentence) set stored in the text (sentence) set storage unit 401, whether or not there is a paraphrase text pair using a question text paraphrase model stored in model storage unit 402. The paraphrase text pairs in the present exemplary embodiment refer to combinations of sentences (two texts, one set) in a paraphrase relationship (that is, content thereof is the same). For example, in a case where the question texts include a plurality of sentences, two sentences in the question texts may be judged as a paraphrase text pair. The text pair extracting unit 301 outputs text pair(s) judged to be paraphrase text pair(s), and stores these in a text pair storage unit 403.

The model learning unit 302 has a function of using the paraphrase text pairs stored in the text pair storage unit 403 as learning data, and of learning a question text paraphrase model. The model learning unit 302 stores the learned question text paraphrase model in the model storage unit 402. Learning, in the present exemplary embodiment, differs from that possessed by conventional existing question text paraphrase models, and indicates overall processing up to obtaining a new question text paraphrase model.

Furthermore, in the present exemplary embodiment, the question text paraphrase model is applied in an optimal format for each respective process. For example, the text pair extracting unit 301, when extracting a paraphrase text pair, uses the question text paraphrase model as a translation probability or the like for judging whether or not this is the paraphrase text pair. Furthermore, the model learning unit 302, for example, learns a question text language model from the extracted paraphrase text pairs. The question text paraphrase model in the present exemplary embodiment includes the translation probability and a question text paraphrase translation model, the question text language model, word strings, and the like.

The text recording unit 303 has a function of updating information of the text set storage unit 401 according to a command inputted by the input unit 100. Specifically, the text recording unit 303 stores the question text set having the same answer text, inputted to the input unit 100, in the text set storage unit 401. Furthermore, the text recording unit 303 has a function of deleting a question text set in the text set storage unit 401 according to a command inputted to the input unit 100. At an occasion of a signal outputted by the text recording unit 303 to the text pair extracting unit 301, a process of extracting a paraphrase text pair described below starts.

The candidate generating unit 304 has a function of generating a paraphrase candidate, with respect to a question text inputted by the input unit 100, and outputting to the output unit 200. Specifically, the candidate generating unit 304 has a function of applying the question text paraphrase model stored in the model storage unit 402, and of generating the paraphrase candidate with respect to the inputted question text in real time. The candidate generating unit 304 outputs the generated paraphrase candidate to the output unit 200.

The storage unit 400 includes the text set storage unit 401, the model storage unit 402, and the text pair storage unit 403. The storage unit 400 is realized, for example, by storage media such as RAM or the like, and stores various types of data such as a control program or the like executed by the data processing device 300. Part of the storage unit 400 may be realized by ROM, and a control program may be stored in a ROM part.

The storage unit 400 has a function of storing the question text inputted by the user and an answer text with respect to the question text, correspondence relationships of the question text and the answer text, the question text paraphrase model, and the like.

The text set storage unit 401 stores a set of question texts inputted by the input unit 100, a set of question texts corresponding to texts of the same answer, created from answer texts with respect to each question text thereof, and the like.

The model storage unit 402 has a function of storing the question text paraphrase model. Specifically, the model storage unit 402 stores the question text language model or a new question text paraphrase model such as a word string or the like, which the model learning unit 302 has learned. The question text paraphrase model stored by the model storage unit 402 is read by the text pair extracting unit 301 and the candidate generating unit 304.

The text pair storage unit 403 has a function of storing text (sentence) pairs (sentence combinations) judged to be paraphrase text pairs by the text pair extracting unit 301, and text data of respective text pairs. The paraphrase text pairs stored by the text paraphrase unit 403 are read by the text pair extracting unit 301 and the model learning unit 302.

In the text paraphrasing system according to the present invention, as described below, learning of the question text paraphrase model is realized by the text pair extracting unit 301, the model learning unit 302, the text recording unit 303, the text set storage unit 401, the model learning unit 402, and the text pair storage unit 403. Furthermore, in the text paraphrasing system according to the present invention, generation of the paraphrase candidates using the question text paraphrase model is realized by the input unit 100, the output unit 200, the candidate generating unit 304, and the model storage unit 402.

Figure 2:
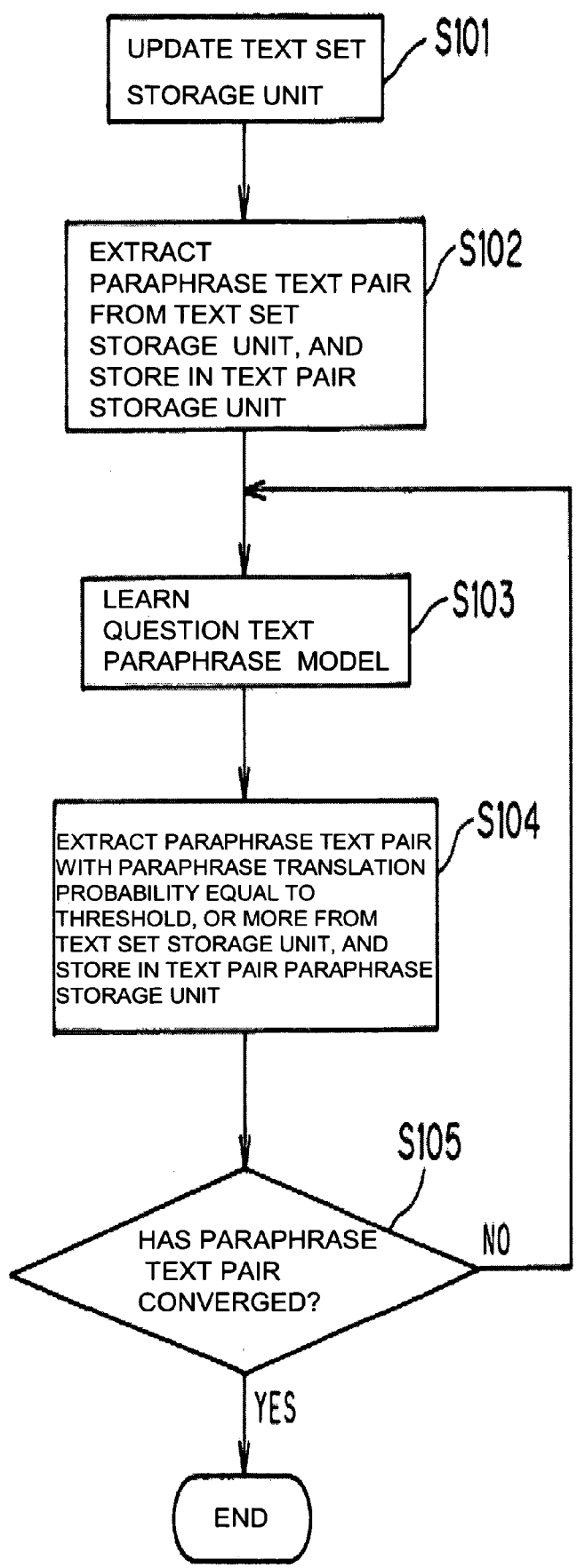
FIG. 2 is a flow chart for describing operation of the text paraphrasing system.

Next, operation of the text paraphrasing system in the present exemplary embodiment is described, making reference to the drawings. FIG. 2 is a flow chart for describing the operation of the text paraphrasing system. In the text paraphrasing system of the present exemplary embodiment, the candidate generating unit 304 reads the question text paraphrase model from the model storage unit 402, and generates paraphrase candidates of the inputted question texts in real time. In the present exemplary embodiment, when the user inputs a question text(s), the question text paraphrase model is assumed to be already existing in the model storage unit 402. Below, a method of learning the question text paraphrase model according to the text paraphrasing system is described.

If a command is inputted by the user to the input unit 100, the text recording unit 303 updates information contained in the text set storage unit 401 (step S101). For example, if a question text set is inputted together with a recorded command, the text recording unit 303 records an inputted question text set in the text set storage unit 401. Furthermore, if, with regard to the text set storage unit 401, for example, a question text is selected and a delete command is inputted, the text recording unit 303 deletes the selected question text from the text set storage unit 401. At an occasion at which information is updated in the text set storage unit 401, the text recording unit 303 sends a signal (trigger) in order to start extraction processing of a paraphrase text pair to the text pair extracting unit 301.

The text pair extracting unit 301, with regard to all text pairs in the question text set stored in the text set storage unit 401, judges whether or not each of the text pairs is in a paraphrase text pair relationship. On this occasion, the text pair extracting unit 301 uses the question text paraphrase model stored in the model storage unit 402 to judge whether or not there is a paraphrase text pair. The text pair extracting unit 301 outputs text pairs judged to be paraphrase text pairs, and stores these in a text pair storage unit 403.

Next, the model learning unit 302 uses the paraphrase text pairs stored in the text pair storage unit 403 as learning data, and learns the question text paraphrase model (step S103). The model learning unit 302 stores the learned question text paraphrase model in the model storage unit 402. The question text paraphrase model refers to the translation probability, the question text paraphrase translation model, the question text language model, the word strings, and the like.

The text pair extracting unit 301, with regard to all text pairs in the question text set stored in the text set storage unit 401, judges once again whether or not each of the text pairs is in a paraphrase text pair relationship. Specifically, the text pair extracting unit 301, with regard to all text pairs in the text set storage unit 401, uses the question text paraphrase model learned by the model learning unit 302 to judge whether or not there is a paraphrase text pair. In such a case, the paraphrase text pair may be extracted from the same question texts. The text pair extracting unit 301 outputs a text pair judged to be a paraphrase text pair, and stores this once again in the text pair storage unit 403 (step S104).

The text pair extracting unit 301 judges whether or not the extracted paraphrase text pair(s) has (have) converged (step S105). In a case where the extracted paraphrase text pair(s) has (have) not converged, the text pair extracting unit 301 and the model learning unit 302 repeatedly execute processing of the above described step S103 and step S104 until the extracted paraphrase text pair(s) will converge. The processing of step S102 and the processing of step S104 in a first round are respectively equivalent to a first sentence extraction step and a second sentence extraction step. In addition, the processing of step S104 in an n-th round, and the processing of step S104 in an (n+1)-th round are respectively equivalent to the first sentence extraction step and the second sentence extraction step. Here, n is an integer greater than or equal to 1. Furthermore, converging of the paraphrase text pair(s) refers to a case where all of the paraphrase text pair extracted by the text pair extracting unit 301 using the latest question text paraphrase model are the same as the paraphrase text pairs extracted using the question text paraphrase model previous to that.

In a case where the extracted paraphrase text pairs converge (step S105: YES), the text paraphrasing system ends generation processing of the question text paraphrase model.

Figure 3:
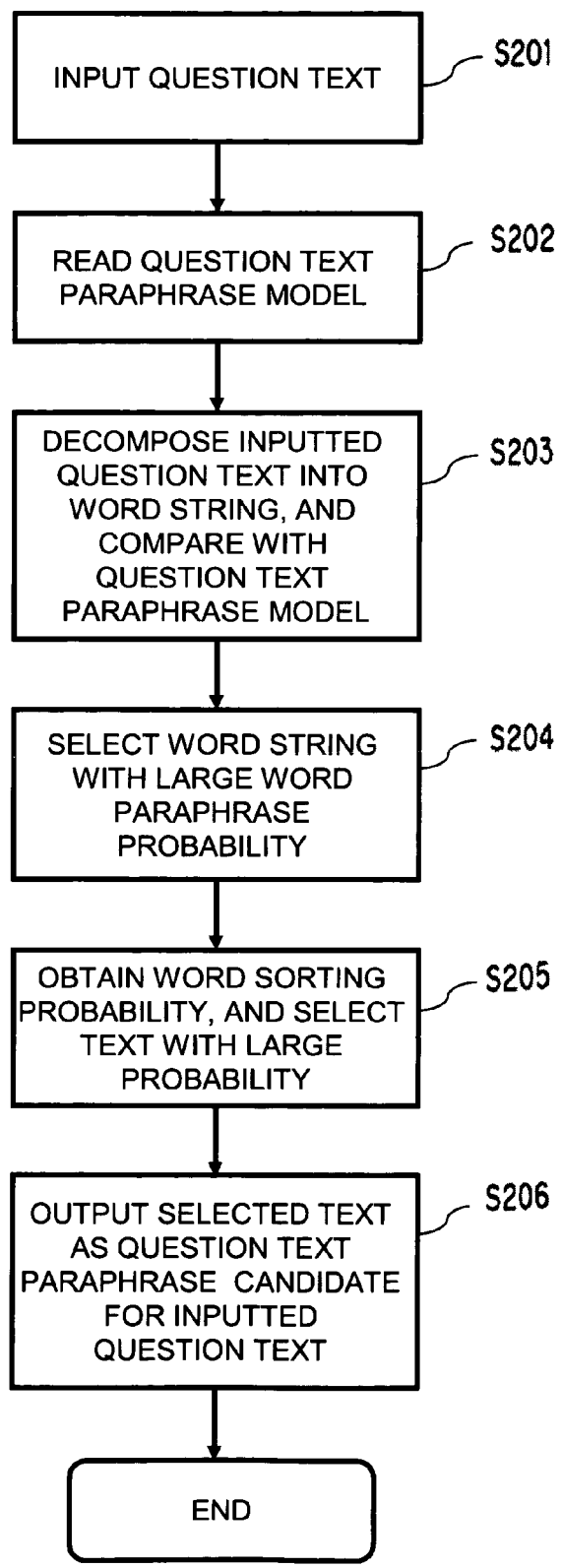
FIG. 3 is a flow chart for describing operation of the text paraphrasing system.

Next, a method of generating paraphrase candidates for question texts inputted to the input unit 100 is described. FIG. 3 is a flow chart for describing operation of the text paraphrasing system according to the present invention.

When the question text is inputted to the input unit 100 (step 201), the candidate generating unit 304 reads the question text paraphrase model from the model storage unit 402 (step S202). The candidate generating unit 304 applies the question text paraphrase model stored in the model storage unit 402, with regard to the question text inputted by the input unit 100, and generates paraphrase candidate(s) with regard to the inputted question text in real time.

The candidate generating unit 304 decomposes the question text inputted to the input unit 100 into word units, and compares with word strings read from the model storage unit 402 (step S203). A plurality of word strings whose word paraphrase probability is large, as described below, is then selected (step S204).

Next, the candidate generating unit 304 sorts the selected word strings and obtains sorting probability, as described below (step S205). The candidate generating unit 304 selects a plurality of texts whose sorting probability is large, to be outputted to the output unit 200 as question text paraphrase candidates (step S206). There may be only 1 paraphrase candidate outputted by the candidate generating unit 304.

Next, the abovementioned operation is described more specifically, making reference to the drawings.

FIG. 4 is a descriptive diagram showing one example of a question text set stored in a text set storage unit 401. FIG. 5 is a descriptive diagram showing one example of answer texts with respect to each question text shown in FIG. 4. In addition, FIG. 6 is a descriptive diagram showing correspondence relationships between each question text in FIG. 4 and the answer texts in FIG. 5.

The correspondence relationships shown in FIG. 6 show that a question text Q1 of FIG. 4, for example, is answered by an answer text A1 of FIG. 5. Furthermore, the correspondence relationships shown in FIG. 6 show that a question text Q4 of FIG. 4, for example, is answered by a text in which two texts, answer texts A1 and A2 of FIG. 5, are linked. In cases where a plurality of answer texts correspond to a question text, FIG. 6 shows that the plural answer texts are included in an answer to the question text. For example, the case of the answer text with respect to the question text Q4 described above shows, not that either one answer text of A1 and A2 are included in the answer text, but that both A1 and A2 answer texts are included.

FIG. 7 is a descriptive diagram showing relationships of question text set(s) corresponding to the same answer text(s), created from the correspondence relationships of FIG. 6. The text set storage unit 401 stores relationships of question text sets as shown in FIG. 7, and question texts (text data) as shown in FIG. 4.

With regard to all the text pairs in question text seta(s) corresponding to the same answer text(s), stored in the text set storage unit 401, the text pair extracting unit 301 uses the question text paraphrase model stored in the model storage unit 402 to judge whether or not there is a paraphrase text pair. For example, in FIG. 7, with regard to all the text pairs included in the question texts Q1 and Q2 corresponding to the answer text A1, the text pair extracting unit 301 judges whether or not each sentence has a paraphrase text pair relationship. In the same way, with regard to all sentences included in the question texts Q1 and Q3 corresponding to the answer text A1, the text pair extracting unit 301 judges whether or not each thereof has a paraphrase text pair relationship. In cases where a plurality of sentences are included in one question text, (for example, a case where the question text Q1 is composed of 3 sentences), the text pair extracting unit 301 judges whether or not there is a paraphrase text pair with regard to each sentence in the same question text.

Next, a method of judging a paraphrase text pair by the text pair extracting unit 301 is described. Here, when there is a paraphrase text pair having a common answer text A, question text 1 (sentence 1) and question text 2 (sentence 2), the text pair extracting unit 301 estimates translation probability from a word string $W_1 \ldots W_k$ of the question text 1 to the word string $W''_1 \ldots W''_m$ of the question text 2, by using the following model $P_{n=1}$ for example. In cases where this value (translation probability) is higher than a threshold, it is judged that the question text 1 and the question text 2 have a paraphrase text pair relationship.

$$P_n(W''_1 \ldots W''_m | W_1 \ldots W_k, A) = \sum_{W'_1 \ldots W'_l} \prod_i P_n(W'_j | W_i, A) * P_n(W''_1 \ldots W''_m | W'_1 \ldots W'_l, A) \geq P_0 \quad (1)$$

In Equation (1) Pθ represents a threshold. Furthermore, product $[\Pi_i P_n(W'_j | W_i, A)]$ with respect to a word string $W_i$ in Equation (1) is equivalent to the question text paraphrase translation model.

The first time (n=1), since word paraphrase probability $P_n(W'_j | W_i, A)$ and word sorting probability $P_n(W''_1 \ldots W''_m | W'_1 \ldots W'_1, A)$ are not learned, $$P_n(W'_j | W_i, A) = (1-\epsilon)\delta_{W'j, wi}\alpha + \epsilon(1-\delta_{W'j, wi}) \quad (2)$$

$$P_n(W''_1 \ldots W''_m | W'_1 \ldots W'_l A) = \delta_{m,l}\delta_{\{W''_1, \ldots, W''_m\}, l\{W'_1, \ldots, W'_l\}} \quad (3)$$

and the like are used as an ad hoc initial translation model. That is, when the text pair extracting unit 301 extracts a paraphrase text pair from the text set storage unit 401 at the start, a question text paraphrase model represented by Equations (2) and (3) is used.

By making a judgment using the abovementioned type of question text paraphrase model, the text pair extracting unit 301 obtains paraphrase text pairs and question text (sentences) as shown in FIG. 8 and FIG. 9 by processing of step S102. FIG. 8 is a descriptive diagram showing one example of paraphrase text pairs extracted by the text pair extracting unit 301. Furthermore, FIG. 9 is a descriptive diagram showing one example of text of each question text corresponding to paraphrase text pairs shown in FIG. 8. The text pair extracting unit 301 stores the extracted paraphrase text pairs and text of each question text corresponding to these paraphrase text pairs, in the text pair storage unit 403 (steps S1102).

Next, the model learning unit 302 uses the paraphrase text pairs (the paraphrase text pairs (paraphrase text pairs and question texts as shown in FIG. 8 and FIG. 9) stored in the text pair storage unit 403, as learning data, and learns the question text paraphrase model $P_{n=2}$.

On this occasion, in order to obtain the word paraphrase probability $P_n(W'_j | W_i, A)$ (that is, the question text paraphrase model), model learning unit 302 performs an estimation (alignment) of correspondence relationships with respect to words of the paraphrase text pairs. Specifically, the model learning unit 302 uses the relationships of the paraphrase text pairs shown in FIG. 8 to estimate the correspondence relationships of words in the question texts shown in FIG. 9.

FIG. 10 is a descriptive diagram showing a result of estimation executed by the model learning unit 320 with respect to a paraphrase text pair (Q1_S1, Q1_S2). In the same way, FIG. 11, FIG. 12, FIG. 13, FIG. 14, and FIG. 15 are descriptive diagrams showing results of estimation executed with regard to, respectively, paraphrase text pair (Q1_S1, Q10_S2), paraphrase text pair (Q2_S1, Q6_S1), paraphrase text pair (Q2_S1, Q9_S2), paraphrase text pair (Q2_S1, Q10_S2), and paraphrase text pair (Q2_S1, Q12_S2). The symbol "ϕ" in FIGS. 10 to 15 indicates that a corresponding word does not exist.

With respect to the paraphrase text pairs shown in FIGS. 10 to 15, the model learning unit 302 estimates word paraphrase probability $P_n(W'_j | W_i, A)$, based on the number of times of paraphrasing between corresponding words. Furthermore, the model learning unit 302 estimates word sorting probability $Pn(W''_1, \ldots W''_m | W'_1, \ldots W'_1, A)$. For example, the model learning unit 302 substitutes sorting from a word string $W'_1, \ldots W'_1$ in which word substitution has been performed to a word string $W''_1 \ldots W''_m$ in the paraphrase text, with appearance probability of word strings after paraphrasing.

$$P_n(W''_1 \cdots W''_m | W'_1 \cdots W'_b A) = \delta_{m,l} \delta_{\{W''_1, \cdots, W''_m\}, l\{W'_1, \cdots, W'l\}} P_{N\text{-}gram}(W''_1 \cdots W''_m) \quad (4)$$

The appearance probability $P_{N\text{-}gram}(W''_1 \ldots W''_m)$ of word strings in Equation (4) is equivalent to the question text language model. The model learning unit 302 learns a question text language model of a type as shown in Equation (4) as the question text paraphrase model, to be stored in the model storage unit 402 (step S103).

The text pair extracting unit 301 uses a newly learned question text paraphrase model $P_{n=2}$, and extracts paraphrase text pairs once again from the text set storage unit 401 (step S104). The text pair extracting unit 301 then stores text pairs judged to be paraphrase text pairs in the text pair storage unit 403.

FIG. 16 is a descriptive diagram showing one example of paraphrase text pairs extracted by the text pair extracting unit 301 using the question text paraphrase model $P_{n=2}$. For example, if the paraphrase text pairs in FIG. 16 and the paraphrase text pairs in FIG. 8 are compared, the text pair (Q4_S1, Q8_S1) has been added in the paraphrase text pairs shown in FIG. 16, as a new paraphrase text pair. The text pair extracting unit 301 records the paraphrase text pairs shown in FIG. 16 in the text pair storage unit 403.

FIG. 17 is a descriptive diagram showing one example of question texts corresponding to the newly added text pair (Q4_S1, Q8_S1) in FIG. 16. Furthermore, FIG. 18 is a descriptive diagram showing a result of estimation executed by the model learning unit 302 with respect to the paraphrase text pair (Q4_S1, Q8_S2).

Since the text pair (Q4_S1, Q8_S1) has been added to the text pair storage unit 403 as a new paraphrase text pair, the text pair extracting unit 301 judges that the paraphrase text pairs have not converged (step S105: NO). When the text pair extracting unit 301 records the paraphrase text pair extracted using the question text paraphrase model $P_{n=2}$ in the text pair storage unit 403, the text pair extracting unit 301 reads the paraphrase text pair extracted using the question text paraphrase model $P_{n=1}$ from the text pair storage unit 403 and judges whether or not the paraphrase text pair has converged.

The model learning unit 302 and the text pair extracting unit 301 once again execute processing of step S103 and step S104. By so doing, the model learning unit 302 obtains a new question text paraphrase model $P_{n=3}$ (step S103).

The text pair extracting unit 301 uses the question text paraphrase model $P_{n=3}$ to extract once again a paraphrase text pair from the text set storage unit 401 (step S104). The text pair extracting unit 301 then judges whether or not the extracted paraphrase text pair has converged (step S105). In cases where the paraphrase text pair extracted using the question text paraphrase model $P_{n=3}$ is not different from the paraphrase text pair (the paraphrase text pair extracted using the question text paraphrase model $P_{n=2}$) extracted the previous time, the text pair extracting unit 301 judges that the paraphrase text pair has converged (step S105: YES). When it is judged that the question text paraphrase pair has converged, the text paraphrasing system ends generation of the question text paraphrase model.

When a question text is inputted to the input unit 100 (step S201), the candidate generating unit 304 reads the question text paraphrase model from the model storage unit 402 (step S202). The candidate generating unit 304 applies the question text paraphrase model stored in the model storage unit 402, with regard to the question text inputted by the input unit 100, and generates paraphrase candidates with regard to the inputted question text in real time.

The candidate generating unit 304 decomposes the question text inputted to the input unit 100 into word units, and compares with word strings read from the model storage unit 402 (step S203). Plural word strings for which word paraphrase probability is large are selected (step S204).

The candidate generating unit 304 executes sorting of the selected word strings and obtains word sorting probability (step S205). The candidate generating unit 304 selects a plurality of texts whose sorting probability is large, and outputs to the output unit 200 as question text paraphrase candidates (step S205). There may be only 1 paraphrase candidate outputted by the candidate generating unit 304.

As described above, the candidate generating unit 304 applies the question text paraphrase model stored in the model storage unit 402 with regard to the question text inputted by the input unit 100, and generates paraphrase candidates.

FIG. 19 is a descriptive diagram showing one example of a question text inputted to the input unit 100. Furthermore, FIG. 20 is a descriptive diagram showing one example of a paraphrase candidate generated by the candidate generating unit 304 using the question text paraphrase model, with regard to the question text shown in FIG. 19. For an input question text Q_in such as shown in FIG. 19, the candidate generating unit 304 uses the question text paraphrase model $P_{n=3}$ to generate paraphrase candidates such as shown in FIG. 20. The candidate generating unit 304 outputs the generated paraphrase candidates together with probability values (scores) of the question text paraphrase model, to the output unit 200 (step S105). The probability values (scores) of the question text paraphrase model are represented as logarithms of the question text paraphrase model (word sorting probability). Furthermore, it is shown that the larger the value of a score (that is, the smaller the absolute value of the score) of the paraphrase candidate, the higher the degree of similarity with respect to inputted question text.

As described above, in the text paraphrasing system in the present exemplary embodiment, only sentences that are in a paraphrase relationship are sifted (sorted), from the question text sets corresponding to the same answer texts. That is, by using the question text paraphrase model, it is possible to extract only text pairs in a paraphrase relationship.

Furthermore, the text paraphrasing system according to the present invention alternately repeats two processes of: extraction of paraphrase text pairs using the question text paraphrase model and learning of the question text paraphrase model by the extracted paraphrase text pairs, until the extracted text sets (extracted paraphrase pairs) have converged, and obtains a final question text paraphrase model. According to this type of sequential processing, it is possible to learn an appropriate paraphrase model, and it is possible to extract with good accuracy text pairs in a paraphrase text relationship, from among the question text sets corresponding to the same answer texts.

A description has been given above relating to preferred embodiments of the present invention, but modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. For example, in the above-mentioned exemplary embodiments a description has been given of cases where the question text paraphrase model already exists in the model storage unit 402, but the text paraphrasing system may start generation of the question text paraphrase model at an occasion at which a question text is inputted to the input unit 100.

INDUSTRIAL APPLICABILITY

The present invention can be applied to a text paraphrasing system in which inputted text is converted to text of a different expression. In particular, since it is possible to resolve expression mismatching in question texts, the present invention can be applied to improvement in accuracy of search of email response examples. Furthermore, the present invention can be applied to automatic generation of answer texts with regard to question texts received by email and to automatic generation of response records (summaries).

The invention claimed is:

1. A text paraphrasing method for generating, with respect to a question text inputted by a user, a question text of different expression but the same content, said method comprising:
   extracting a combination of sentences having a degree of similarity greater than or equal to a set threshold, from among question texts having the same answer texts stored in storage unit, termed "first sentence extraction step";
   computing a conversion rule for converting from said combination of sentences extracted in said first sentence extraction step, to a sentence of the same content but different expression, termed "conversion rule computation step";
   extracting again from said storage unit a combination of sentences having a degree of similarity greater than or equal to said threshold, using said conversion rule computed in said conversion rule computation step, termed "second sentence extraction step";
   judging whether or not all of said combinations of sentences extracted in said first and said second sentence extraction steps match, termed "judging step"; and
   generating a paraphrase text of said inputted question text, using said conversion rule computed in said conversion rule computation step, termed "text generation step"; wherein
   execution of said first sentence extraction step, said conversion rule computation step, and said second sentence extraction step is repeated until it is judged that said combinations of sentences extracted in said first and said second sentence extraction steps all match.

2. The text paraphrasing method according to claim 1, further comprising displaying a generated paraphrase text to a user, wherein
   said generated paraphrase text is displayed together with a value indicating a degree of similarity with respect to an inputted question text.

3. The text paraphrasing method according to claim 1, wherein said text generation step comprises:
   decomposing an inputted question text into a word string;
   comparing said conversion rule computed in said conversion rule computation step and said word string, and selecting a plurality of word strings with high degrees of similarity, termed "selection step" and
   sorting said word strings selected in said selection step.

4. A conversion rule computing method for computing, with respect to a question text inputted by a user, a conversion rule for generating question text(s) of different expression but the same content, said method comprising:
   extracting a combination of sentences having a degree of similarity greater than or equal to a set threshold, from among question texts having the same answer texts stored in a storage unit, termed "first sentence extraction step";
   computing a conversion rule for converting from said combination of sentences extracted in said first sentence extraction step to a sentence of the same content but different expression, termed "conversion rule computation step";
   extracting again from said storage unit a combination of sentences having a degree of similarity greater than or equal to said threshold, using said conversion rule computed in said conversion rule computation step, termed "second sentence extraction step"; and
   judging whether or not all of said combinations of sentences extracted in said first and said second sentence extraction steps match, termed "judging step"; wherein
   execution of said first sentence extraction step, said conversion rule computation step, and said second sentence extraction step is repeated until it is judged that said combinations of sentences extracted in said first and said second sentence extraction steps all match.

5. The conversion rule computing method according to claim 4, wherein
   a question text inputted by input unit, an answer text with respect to said question text, and information indicating a correspondence relationship of said question text and said answer text are stored in a storage unit,
   said information is applied with respect to one group in which answer texts of the same content are collected, and
   a group of question texts corresponding to answer texts of the same content is generated.

6. The conversion rule computing method according to claim 4, comprising updating information stored in said storage unit; wherein
   at an occasion at which said information in said storage unit is updated, processing is started in said first sentence extraction step.

\* \* \* \* \*